May 26, 1970  R. L. GOUILLOU  3,514,583
APPARATUS FOR MEASURING HIGH-FREQUENCY IMPEDANCES
Filed June 20, 1968  7 Sheets-Sheet 1

INVENTOR:
Roger L. GOUILLOU
By Abraham A. Saffitz
ATTORNEY

May 26, 1970  R. L. GOUILLOU  3,514,583
APPARATUS FOR MEASURING HIGH-FREQUENCY IMPEDANCES
Filed June 20, 1968  7 Sheets-Sheet 5

INVENTOR:
Roger L. GOUILLOU
By Abraham A. Saffitz
ATTORNEY

May 26, 1970  R. L. GOUILLOU  3,514,583
APPARATUS FOR MEASURING HIGH-FREQUENCY IMPEDANCES
Filed June 20, 1968  7 Sheets-Sheet 4

INVENTOR:
Roger L. GOUILLOU
By Abraham A. Saffitz
ATTORNEY

May 26, 1970  R. L. GOUILLOU  3,514,583
APPARATUS FOR MEASURING HIGH-FREQUENCY IMPEDANCES
Filed June 20, 1968  7 Sheets-Sheet 5

INVENTOR:
Roger L. GOUILLOU
By Abraham A. Saffitz
ATTORNEY

May 26, 1970     R. L. GOUILLOU     3,514,583
APPARATUS FOR MEASURING HIGH-FREQUENCY IMPEDANCES
Filed June 20, 1968     7 Sheets-Sheet 6

INVENTOR:
Roger L. GOUILLOU

May 26, 1970 R. L. GOUILLOU 3,514,583
APPARATUS FOR MEASURING HIGH-FREQUENCY IMPEDANCES
Filed June 20, 1968 7 Sheets-Sheet 7

INVENTOR:
Roger L. GOUILLOU
By Abraham A. Saffitz
ATTORNEY

United States Patent Office 3,514,583
Patented May 26, 1970

3,514,583
APPARATUS FOR MEASURING HIGH-FREQUENCY IMPEDANCES
Roger L. Gouillou, Draveil, France, assignor to Office National d'Etudes et de Recherches Aerospatiales, Bagneux, France, a body corporate of France
Filed June 20, 1968, Ser. No. 738,588
Int. Cl. G06c 3/00
U.S. Cl. 235—88        5 Claims

ABSTRACT OF THE DISCLOSURE

Apparatus for measuring the impedances of loads fed by high-frequency currents through a high-frequency line having inserted therein three detector probes. The apparatus comprises a plate carrying a Smith chart pattern and three scale patterns rotatable about points of the zero-resistance circle of the chart. The pivot of each scale pattern can be displaced along the zero-resistance circle. The measure is achieved by setting the pivots of the scale patterns along the zero-resistance circle in dependence of the spacings of the detector probes along the high-frequency line and by bringing into coincidence the graduations of the three scale patterns corresponding to the currents measured by the three detector probes.

---

The present invention relates to an apparatus for measuring high-frequency impedances.

The conventional apparatuses for measuring high-frequency impedances generally employ longitudinally split high-frequency waveguides or lines, along which probes comprising detector diodes can move, or non-split high-frequency waveguides or lines comprising fixed probes with predetermined spacing. In general, the voltages detected by these probes are not used directly.

To operate a Smith chart, it is necessary to know the load impedance when it is desired to calculate the input impedance of a high-frequency line, or the voltage standing wave ratio and the distance of the load from a maximum or minimum voltage when it is desired to know the load impedance. To obtain the voltage standing wave ratio, it is necessary to determine the position of a maximum and of a minimum voltage and the ratio between these two values. These determinations lack precision and it would be preferable to use directly the voltages detected at fixed points by the probes in order to obtain the impedance of a load.

The impedancemeter comprising four probes spaced at intervals corresponding to one-eighth of the wavelength in the line exploits a remarkable mathematical property of the voltages existing on a line at points spaced exactly at one-eighth wavelength intervals. This property can be manifested if the four voltmeters associated with the waves have response curves in function of the voltage which are rigorously identical and exactly square. The two-by-two differences between the indications of the four voltmeters can then be used as the abscissa and ordinate of a Cartesian network superimposed on a circular impedance diagram. The impedancemeter with four probes spaced at intervals corresponding to one-eighth wavelength operates in a very narrow frequency band. It imposes great demands on the quality of each of the detectors. Its indications will be erroneous and cannot be corrected if the voltage supplied by the microwave generator differs from the voltage used during a preceding calibration.

The object of the present invention is to provide a high-frequency impedancemeter, in which the operative data for a Smith chart are constituted by the voltages detected in any three points of a high frequency line.

To facilitate the understanding of the invention, it will be opportune to recall certain known properties of the Smith chart.

The complex voltage E in a given point of the high-frequency line equals the vectorial sum of the voltage $E^+$ of the outgoing wave and the voltage $E^-$ of the return wave at this point of the line, which may be written:

$$E = E^+ + E^-$$
$$E/E^+ = 1 + E^-/E^+$$
$$E/E^+ = 1 + (E_R^- e^{-\beta d})/(E_R^+ e^{+\beta d})$$
$$E/E^+ = 1 + \Gamma e^{-2\beta d}$$
$$E/E^+ = 1 + |\Gamma| e^{\Psi - 2\beta d} = 1 + |\Gamma| e^{-2\Phi} \quad (1)$$

wherein $E_R^+$ and $E_R^-$ are respectively the voltages of the incident wave and the reflected wave at the extremity of the high-voltage line, $|\Gamma|$ is the amplitude of the reflection coefficient, equal to $$|\Gamma| = |E_R^-|/|E_R^+| = \frac{z-1}{z+1}$$

($z$ being the impedance of the load at the extremity), $\Psi$ is the load phase angle, $d$ is the distance of the point considered from the extremity of the line and $\beta$ is the phase constant of the line, equal to $2\pi/\lambda$, $\lambda$ being the wavelength.

Referring now to FIG. 1, the impedance of the receiving extremity of the line is represented by the point M, such that $$\overrightarrow{OC} = 1$$
$$\overrightarrow{CM} = \Gamma$$
$$\widehat{O'CM} = \Psi$$

wherein the distance OM represents $E_R/E_R^+$, and the impedance at a point located at a distance $d$ from the extremity is represented by the point M' such, that $$\overrightarrow{OC} = 1$$
$$\overrightarrow{CM'} = \Gamma$$
$$\widehat{O'CM'} = \Psi - 2\beta d$$

wherein the distance OM' represents $E/E^+$.

It is seen therefore that if on the circle of zero resistance of the chart a point $0_1$ is plotted such that $$\widehat{0_1 CP} = 2\beta d$$

the distance $0_1 M$ is proportional to E. Consequently, if three detectors are placed on a high-frequency line, respectively at distances $d_1$, $d_2$, $d_3$ from the extremity connected to the load, and if on the zero-resistance circle of the chart three points $0_1$, $0_2$, $0_3$ are plotted such that $$\widehat{0_1 CO} = (4\pi/\lambda) d_1$$
$$\widehat{0_2 CO} = (4\pi/\lambda) d_2$$
$$\widehat{0_3 CO} = (4\pi/\lambda) d_3$$

and lastly if three circles are traced having for centers respectively $0_1$, $0_2$, $0_3$ and for respective radii the voltages detected on the line by the three detectors, these three circles will intersect at the point M, whose impedance on the chart corresponds to the impedance of the load. In the general case, two measuring points on the line and two points on the zero-resistance circle would be sufficient to know the load impedance. The third measuring point and the third point on the zero-resistance circle serve to eliminate any doubts which may arise when the first two circles intersect in two points of the chart or when the voltage level of the high-frequency or microwave generator differs from the level defined during the initial calibration.

According to the invention, the apparatus for measuring impedance comprises a circular tray bearing a Smith chart, and at least two, but preferably three scales whose zeros are located on the boundary circle of the Smith chart and which are adjustable relative to said chart. These scales may for example be small rules pivoting on movable limbs about the tray or discs rotating about the axis of the chart (point of unit resistance and zero reactance) and carry a sheaf of circles centered on a point of their circumference.

The invention will now be described with reference to the accompanying drawings, which illustrate the invention but in no restrictive sense.

in FIG. 3, the pivots of the small rules are not on the same azimuth of the chart, whereas in FIG. 4 they are located on the same azimuth;

FIG. 5 alone shows the base plate of the apparatus after removal of the disks;

Figure 1:
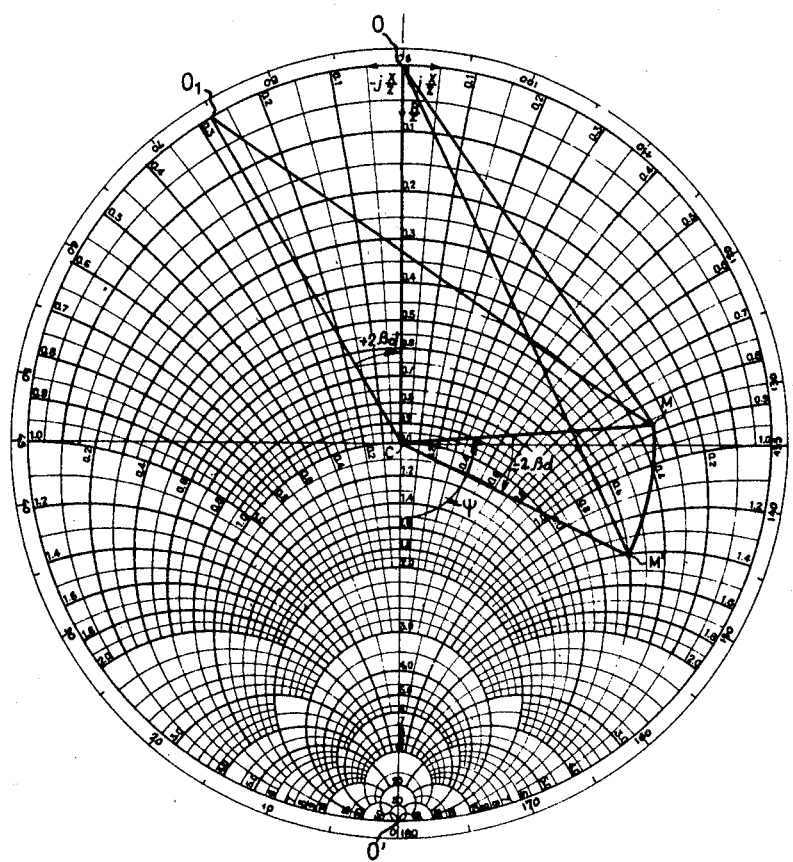
FIG. 1 shows a Smith chart, for the theoretical explanation of the invention.
Figure 2:
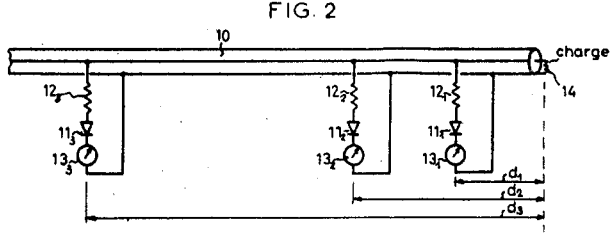
FIG. 2 illustrates a coaxial line with three detectors spaced thereon.

FIG. 1 has been explained in the introductory part of the present specification; referring now to FIG. 2, reference 10 designates a high-frequency or microwave line, for example a coaxial cable, connected to a load 14, whilst reference $11_1$, $11_2$, $11_3$ designate three detector diodes, each connected between the central conductor and the external conductor of the coaxial cable 10 in series with a resistance, respectively $12_1$, $12_2$, $12_3$ and a milliammeter $13_1$, $13_2$, $13_3$. However, the coupling of each of the milliammeters to the line could also be effected by means of a capacitor.

The distances between the diodes and the load 14 are respectively $d_1$, $d_2$, $d_3$. These distances may be of any length; however, it is desirable to realize the condition:

$$d_3 - d_1 \geqslant -/10$$

wherein $\lambda$ is the wavelength on the line corresponding to the lowest operating frequency. Of course, if the high-frequency line is a waveguide, $\lambda$ will be the wavelength within said waveguide. It is also desirable not to locate the detector $11_2$ at equal distance from the detectors $11_1$ and $11_3$.

It is desirable to have identical "current voltage" curves of the diodes, but this is not a necessary condition. It is sufficient to have the small rule of the apparatus associated with each diode graduated in values of the current in dependence of the indications of the milliammeter connected into the circuit of said diode, which can be effected by a calibration.

Figure 3:
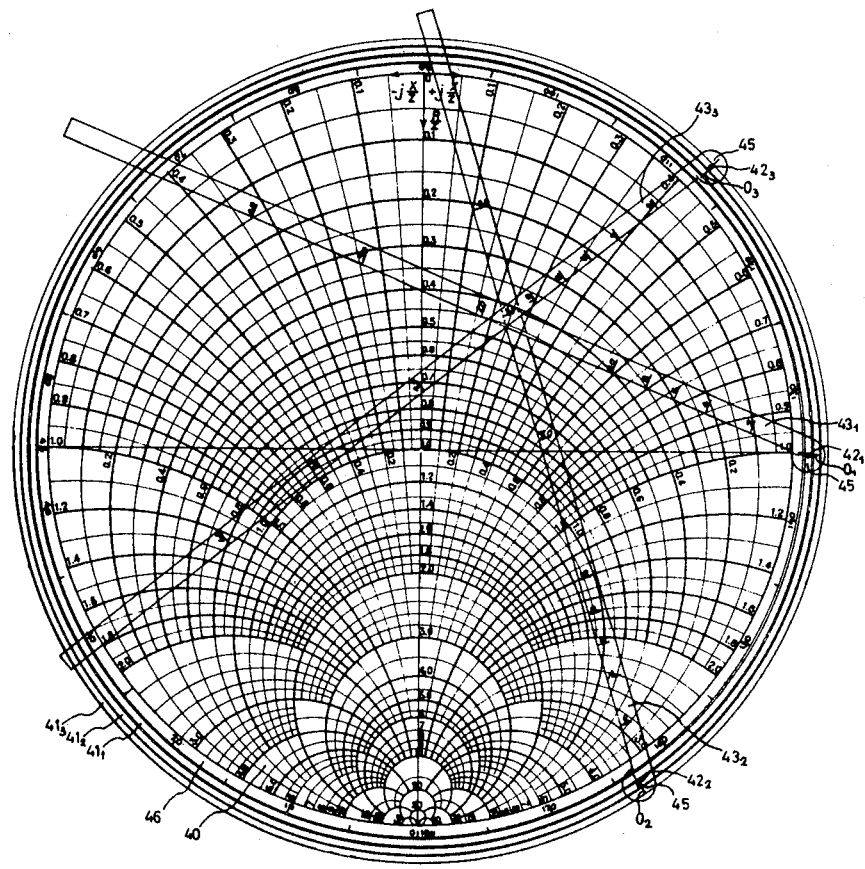
FIGS. 3 and 4 are respectively plan and sectional views of the impedance-measuring apparatus according to the invention.
Figure 4:
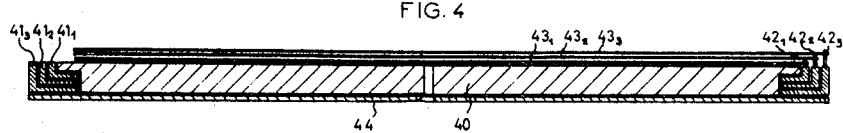
Figure 5:
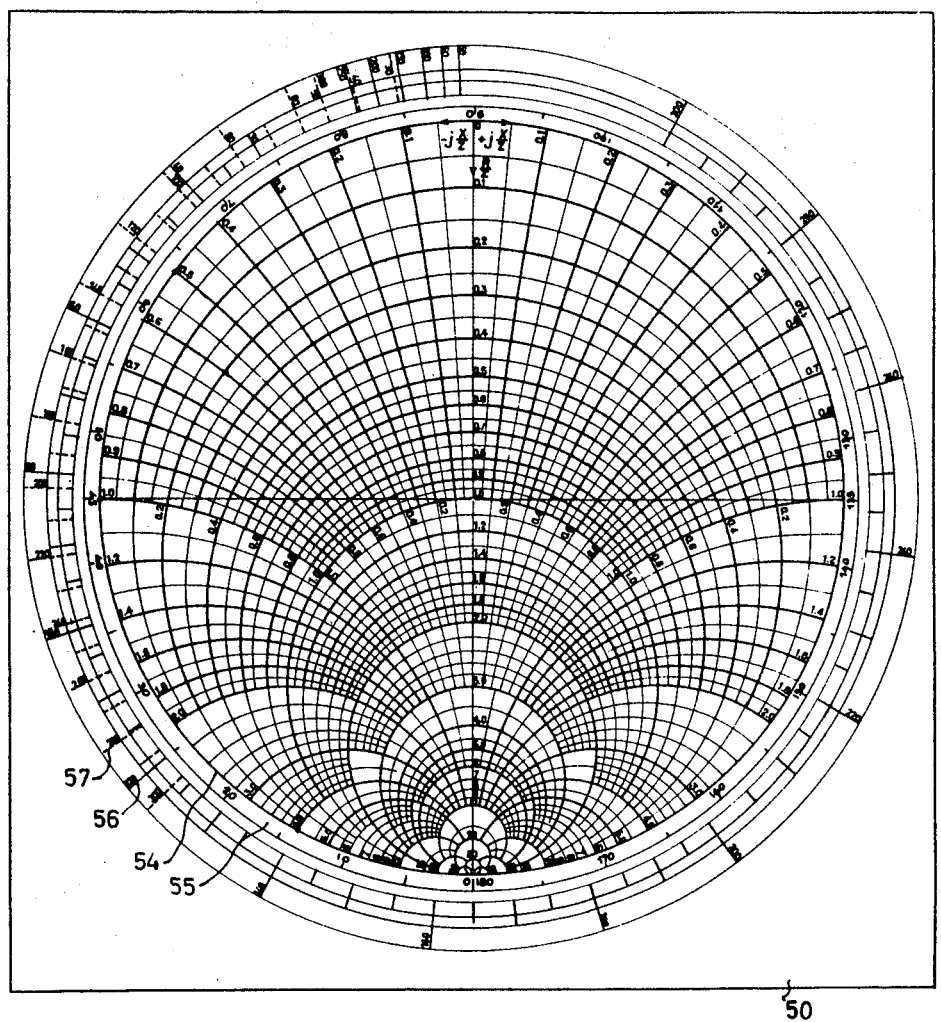
FIGS. 5 and 6 are respectively plan and sectional views of a different embodiment of the apparatus according to the invention, in which the transparent small rules are replaced by transparent coaxial disks comprising networks of circles.
Figure 6:
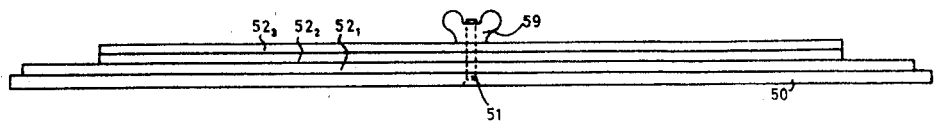
Figure 7:
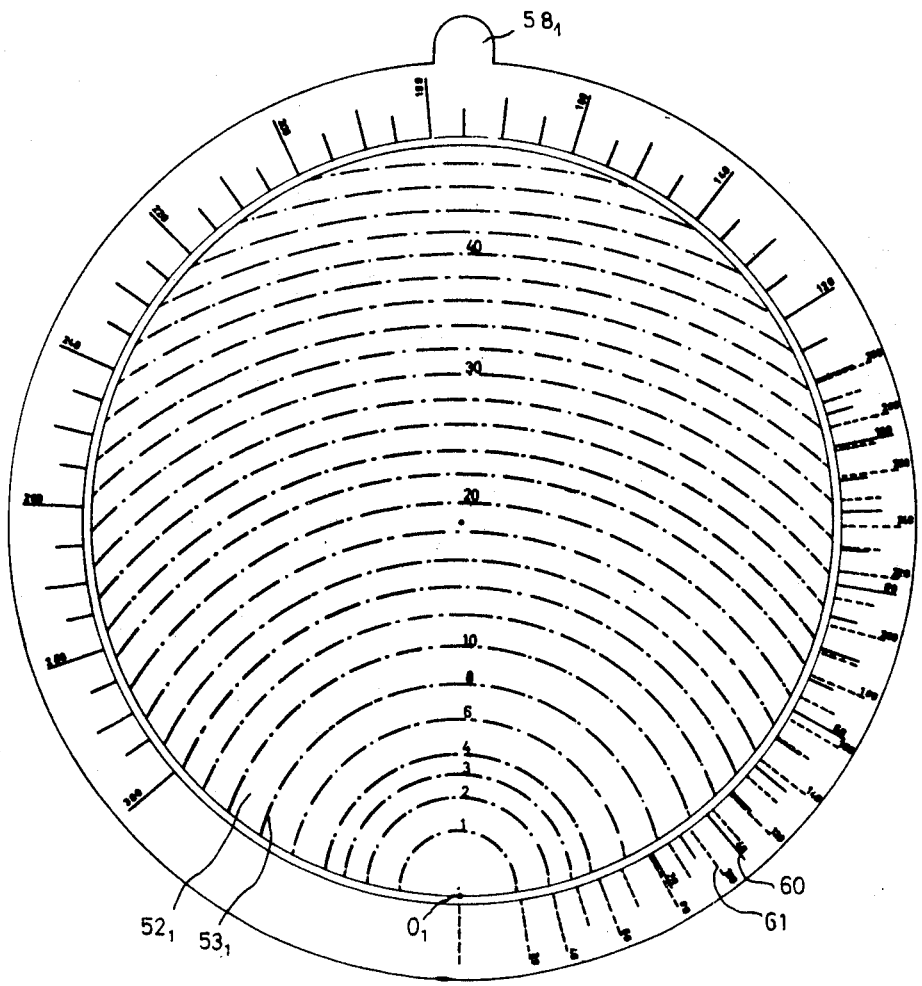
FIGS. 7, 8 and 9 show the three disks of the apparatus according to FIGS. 5 and 6.
Figure 8:
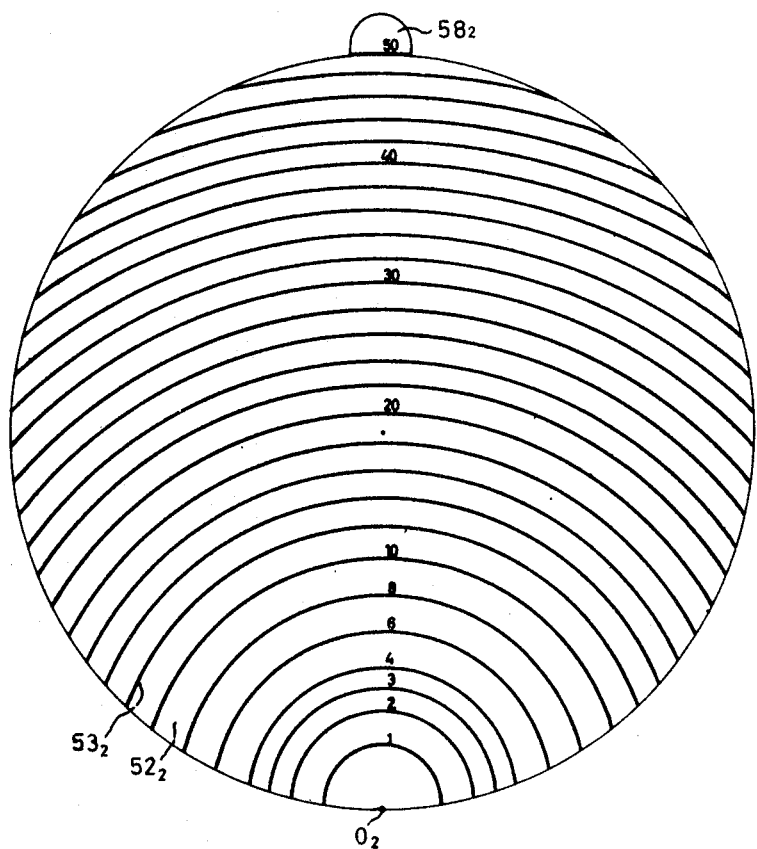

The apparatus for measuring the impedances from the data supplied by the detector diodes is shown in FIGS. 3 and 4. It comprises a plate 40 with the Smith chart printed or etched thereon. This plate is bounded by three annular limbs $41_1$, $41_2$, $41_3$ held in position by a bearing plate 44 and each carrying a pin acting as pivot perpendicular to its plane, respectively referenced as $42_1$, $42_2$, $42_3$. To each pivot there may be removably attached a small rule made of a transparent material, referenced $43_1$, $43_2$ and $43_3$ respectively. These small rules or reglets can rotate about their pivot. To this end, each reglet comprises at one of its extremities a portion 45 forming a sleeve, into which the corresponding pivot can engage. The width of the limbs is very small, so that the pivot of each reglet can be considered for practical purposes as being located on the contour of the zero-resistance circle of the chart. The length of the reglets equals the diameter of the zero-resistance circle. The distance between the reglet pivoting on the first limb and the upper plane of plate 40 is smaller than that between the second and third limb reglets and said plate, in order to ensure the greatest possible mobility for the reglets. Each reglet is graduated in milliamperes; normally all graduations are identical and linear, but it is also possible to provide one reglet a nonlinear graduation in milliamps corresponding to a linear graduation in millivolts of high frequency, if the detector associated with said reglets is itself nonlinear.

The circumference of the Smith chart is provided with the usual graduations 46 in phase angle $\theta$ of the reflection coefficient. This angular graduation can also serve for positioning the reference points carried by the limbs opposite to the pivots $42_1$, $42_2$ and $42_3$, respectively referenced $0_1$, $0_2$ and $0_3$ in dependence of the distances $d_1$, $d_2$, $d_3$ which are known. For example, the location of reference $0_1$ is such, that $$\widehat{O_1CO} = (4\pi d_1)(1/\lambda) = (4\pi d_1/c)F$$

$(4\pi d_1)/c$ being a constant, a graduation in frequency can be associated with the usual angular graduation.

The apparatus is used in the following manner:

(1) Place the references $0_1$, $0_2$, $0_3$ to the desired points of scale 46, taking into account the working frequency.

(2) Orient the reglets so that they intersect at the point of zero impedance, 0. Read on the reglets the divisions corresponding to the intersection.

(3) Short-circuit the extremity of the line on the load side. Connect the variable-level generator, operating at working frequency, to the input of the line. Regulate the output level of the generator so that the measuring indicators give the divisions read off the reglets during operation 2. The apparatus is then calibrated. Leave the high-frequency level as it is.

(4) Connect the unknown load. Read the current on the indicator devices to which the divisions of the reglets correspond. Turn each reglet until the three divisions coincide. The point thus obtained is the figurative point of the unknown impedance or admittance. The chart gives the resistance and the reactance or the conductance and the susceptance of the load. As already stated, it will be generally sufficient to have two reglets for defining this point. The third serves as confirmation. It will be noted that any of the three reglets may serve as confirmation, depending on the frequency.

Referring now to FIGS. 5, 6, 7, 8, 9 and 10, the impedance-measuring apparatus comprises a plate 50 bearing the Smith chart and has a central axle 51 passing through the chart at the point of unit resistance and zero reactance. This axle carries three transparent disks $52_1$, $52_2$, $52_3$. These disks are provided with peripheral lugs $58_1$, $58_2$, $58_3$ respectively, to facilitate their operation, and they can be fixed in position by means of a wing nut 59.

Figure 9:
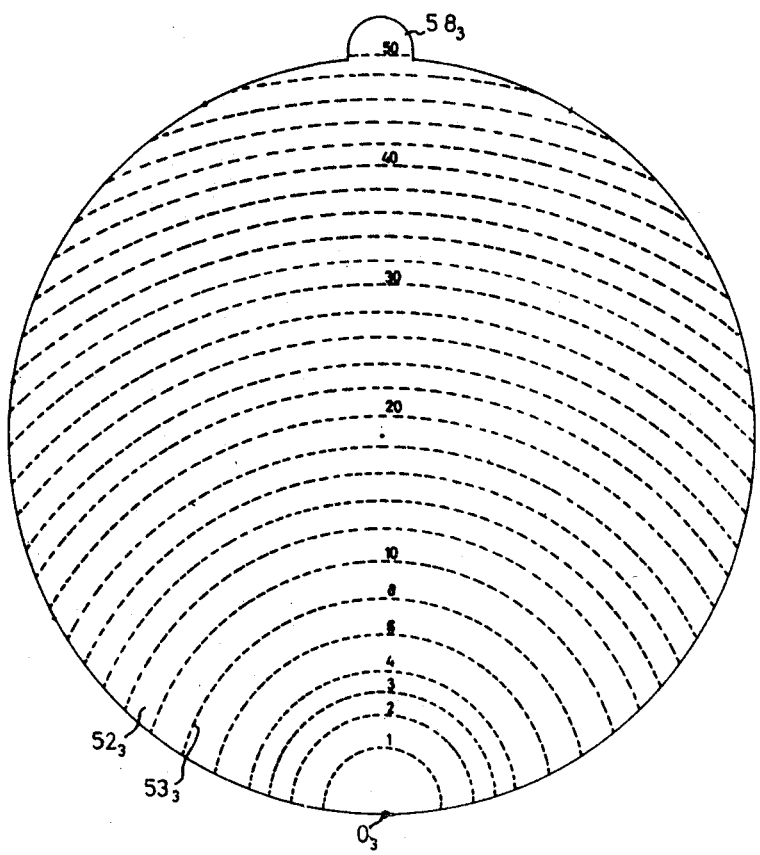

The disks are traced, for example by engraving, with sheafs of concentric circles, $53_1$ on disk $52_1$, $53_2$ on disk $52_2$, $53_3$ on disk $52_3$, having their centres at $0_1$, $0_2$, $0_3$ on the boundary circles of these disks. These latter circles are of equal size and are superimposed on the zero-resistance circle of the chart, referenced 54. To enable the disks to be distinguished in FIG. 10, the circles $53_1$ are drawn in composite line (FIG. 7), the circles $53_2$ in full line (FIG. 8) and the circles $53_3$ in dotted line (FIG. 9). The circumference of the Smith chart is provided with the usual graduation 55 in degrees, and with two scales 56 and 57 of frequency, corresponding to two values of $d_1$. These divisions make possible the positioning of the first disk $53_1$ relative to the chart. Another way of positioning $53_1$ will be described in the following.

The periphery of the first disk $53_1$ has traced thereon two frequency scales 60 and 61 corresponding respectively to given values of $(d_2-d_1)$ and of $(d_3-d_1)$, which serve for positioning the second and third disks relative to the first disk.

Figure 10:
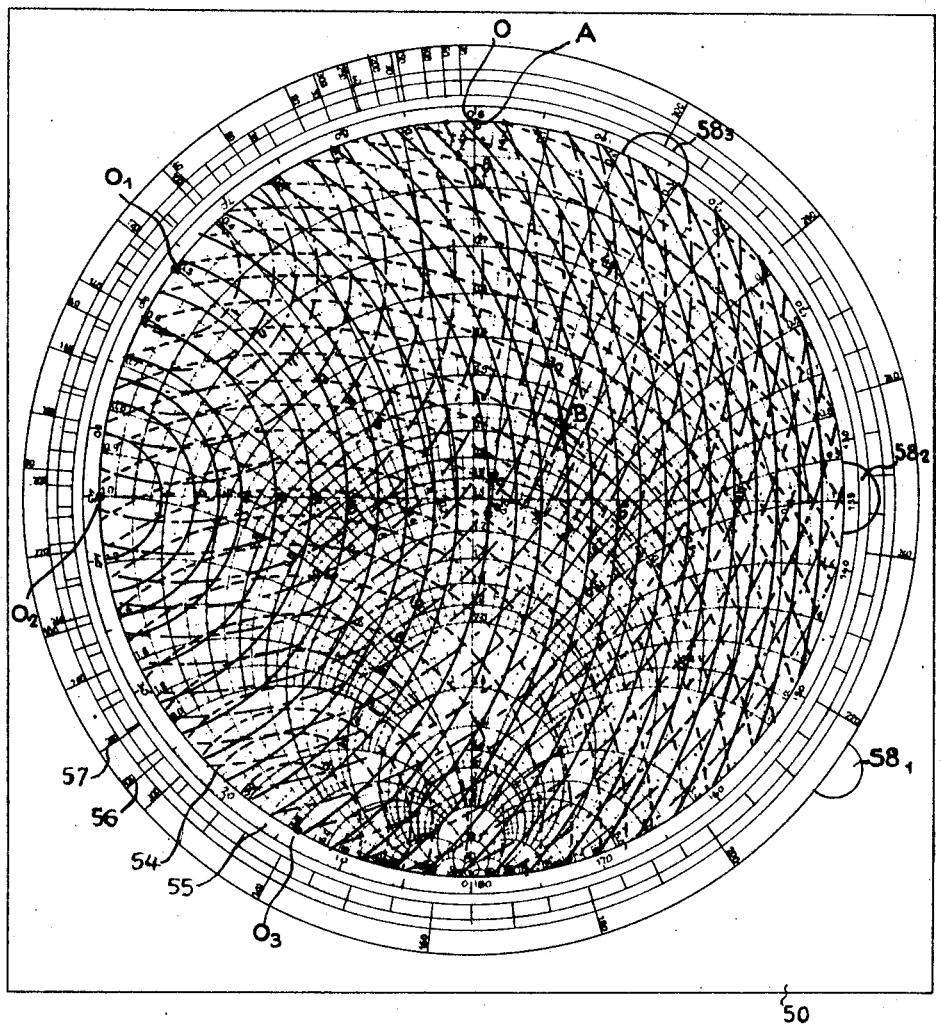
FIG. 10 shows the apparatus with the three disks in place.

An example of application will now be described with reference to FIG. 10.

It is assumed that the operating frequency is of 100 mHz. $0_2$ is placed on the line 100 mHz. of the scale 61 and $0_3$ is placed on the line 100 mHz. of the scale 60. The respective position of the three disks is thus determined. There remains to be defined the position of the first disk reltaive to the chart.

In a short-circuit measurement, the following values of the detected current are found:

$$i_1=16 \text{ ma.} \quad i_2=30 \text{ ma.} \quad i_3=48 \text{ ma.}$$

These values define the point A by intersection of a circle $53_1$ of radius 16, of a circle $53_2$ of radius 30 and of a circle $53_3$ of radius 48. The set $52_1$–$52_2$–$52_3$ is rotated to bring A on the point 0 of zero-resistance and zero-resistance (point 0 in FIG. 1). The position of disk $52_1$ relative to the chart is thus determined.

In a measurement carried out with a loaded line the following values of the detected current are found:

$$i_1=22 \text{ ma.} \quad i_2=26 \text{ ma.} \quad i_3=27 \text{ ma.}$$

These values define the point B by intersection of a circle $53_1$ of radius 22, of a circle $53_2$ of radius 26, and of a circle $53_3$ of radius 27. The reduced impedance corresponding to point B is read off the chart, finding:

$$z=0.6+j0.32$$

Although the invention has been described with reference to particular forms of embodiment, it will be obvious that numerous variants, easily imaginable by those skilled in the art are possible, which fall within the scope of the invention.

The high frequency line serving for measurement may be of any known type, such as a two-wire line, armoured two-wire line, waveguide, stripline, direct-wave lines, etc.

The measurements can be read directly by the operator on the measuring apparatuses or by telemetry.

The practical form of construction of the apparatus may vary; only the chart-carrying plate and the orientable scales, at least two, whose zeros must be on the peripheral circle of the chart, are essential components.

The sheafs of circles traced on the three disks may of course be in different colours.

What I claim is:

1. An apparatus for measuring the impedances of loads fed by high-frequency currents through a high-frequency line from the measured values of the current detected by at least two probes inserted in said line, comprising a plate, a Smith chart pattern carried on said plate and bounded by a circle of zero-resistance, at least two scale patterns graduated in current the zero graduation of which lies on the zero-resistance circle of said Smith chart pattern and means for independently displacing the zero graduation of each of said scale patterns around the zero-resistance circle of the chart pattern.

2. An apparatus as set forth in claim 1 in which the scale patterns comprise rectilinear transparent rules graduated in current and having a sleeve at the place of the zero graduation thereof and the means for independently displacing the zero graduation of each of the scale patterns around the zero-resistance circle of the chart pattern comprises annular limbs rotatable around the chart pattern, respectively associated with the rules and having a pin cooperating with the sleeve.

3. An apparatus for measuring the impedances of loads fed by high-frequency currents through a high-frequency line from the measured values of the current detected by at least two probes inserted in said line, comprising a plate, a Smith chart pattern carried on said plate and bounded by a circle of zero-resistance, at least two circular transparent discs rotatable about the center of the Smith chart pattern and having traced thereon sheafs of concentric circles having a common center lying on the zero-resistance circle of the chart pattern.

4. An apparatus as set forth in claim 3, in which the circular transparent discs are three in number.

5. An apparatus as set forth in claim 3, in which the sheafs of concentric circles traced on the discs are of different colors on each disc.

References Cited
UNITED STATES PATENTS

| | | | |
|---|---|---|---|
| 3,047,221 | 7/1962 | Alfaya et al. | 235—64.7 |
| 3,128,944 | 4/1964 | Gabriel | 235—61 |

STEPHEN J. TOMSKY, Primary Examiner

U.S. Cl. X.R.

235—61, 116